(12) United States Patent
Yang

(10) Patent No.: US 11,161,277 B2
(45) Date of Patent: Nov. 2, 2021

(54) MOLD FOR MANUFACTURING SLAB AND MANUFACTURING METHOD THEREOF

(71) Applicant: Jeonjin Co., Ltd., Gimpo-si (KR)

(72) Inventor: Ho Seok Yang, Gimpo-si (KR)

(73) Assignee: Jeonjin Co., Ltd.

( * ) Notice: Subject to any disclaimer, the term of this patent is extended or adjusted under 35 U.S.C. 154(b) by 155 days.

(21) Appl. No.: 16/265,966

(22) Filed: Feb. 1, 2019

(65) Prior Publication Data

US 2019/0240874 A1    Aug. 8, 2019

(30) Foreign Application Priority Data

Feb. 6, 2018  (KR) ........................ 10-2018-0014742

(51) Int. Cl.
| | | |
|---|---|---|
| B29C 33/40 | (2006.01) | |
| B32B 3/26 | (2006.01) | |
| B32B 25/10 | (2006.01) | |
| B32B 25/14 | (2006.01) | |
| B32B 3/08 | (2006.01) | |
| B32B 3/02 | (2006.01) | |
| B32B 37/00 | (2006.01) | |
| B29C 67/24 | (2006.01) | |
| B32B 5/02 | (2006.01) | |
| B28B 7/34 | (2006.01) | |
| B32B 25/02 | (2006.01) | |
| B32B 7/10 | (2006.01) | |

(Continued)

(52) U.S. Cl.
CPC ............ *B29C 33/405* (2013.01); *B28B 7/348* (2013.01); *B29C 33/3842* (2013.01); *B29C 67/243* (2013.01); *B32B 3/02* (2013.01); *B32B 3/08* (2013.01); *B32B 3/263* (2013.01); *B32B 3/30* (2013.01); *B32B 5/02* (2013.01); *B32B 7/10* (2013.01); *B32B 25/02* (2013.01); *B32B 25/10* (2013.01); *B32B 25/14* (2013.01); *B32B 37/00* (2013.01); *B29K 2823/04* (2013.01); *B29K 2823/12* (2013.01); *B29K 2913/00* (2013.01); *B32B 2250/04* (2013.01); *B32B 2250/42* (2013.01); *B32B 2307/554* (2013.01)

(58) Field of Classification Search
CPC .... B28B 7/348; B29C 33/3842; B29C 33/405
See application file for complete search history.

(56) References Cited

U.S. PATENT DOCUMENTS

| | | | | |
|---|---|---|---|---|
| 4,977,200 A | * | 12/1990 | Itoh ........................... | C08J 9/06 523/223 |
| 6,773,641 B1 | | 8/2004 | Toncelli | |
| 7,241,710 B2 | | 7/2007 | Toncelli | |

FOREIGN PATENT DOCUMENTS

| | | |
|---|---|---|
| EP | 1160064 B1 | 3/2006 |
| JP | H09254164 A | 9/1997 |

(Continued)

*Primary Examiner* — James Sanders
(74) *Attorney, Agent, or Firm* — Renaissance IP Law Group LLP

(57) ABSTRACT

The present disclosure herein relates to a mold for manufacturing a slab. More particularly, the mold includes a first fabric layer, a first rubber layer disposed on the first fabric layer, a second fabric layer disposed on the first rubber layer, and a second rubber layer disposed on the second fabric layer. Here, the second rubber layer includes a base part and a frame part extending from an edge of the base part. Also, the base part and the frame part are integrated with each other.

8 Claims, 10 Drawing Sheets

(51) Int. Cl.
*B32B 3/30* (2006.01)
*B29C 33/38* (2006.01)

(56) References Cited

FOREIGN PATENT DOCUMENTS

| | | |
|---|---|---|
| KR | 101079040 B1 | 11/2011 |
| KR | 101108414 B1 | 1/2012 |
| KR | 101110920 B1 | 3/2012 |
| KR | 101133401 B1 | 4/2012 |
| KR | 101488732 B1 | 2/2015 |
| KR | 20150048303 A | 5/2015 |
| KR | 101746595 B1 | 6/2017 |
| KR | 20180001065 A | 1/2018 |
| WO | 2006013589 A1 | 2/2006 |
| WO | 2012056359 A1 | 5/2012 |

* cited by examiner

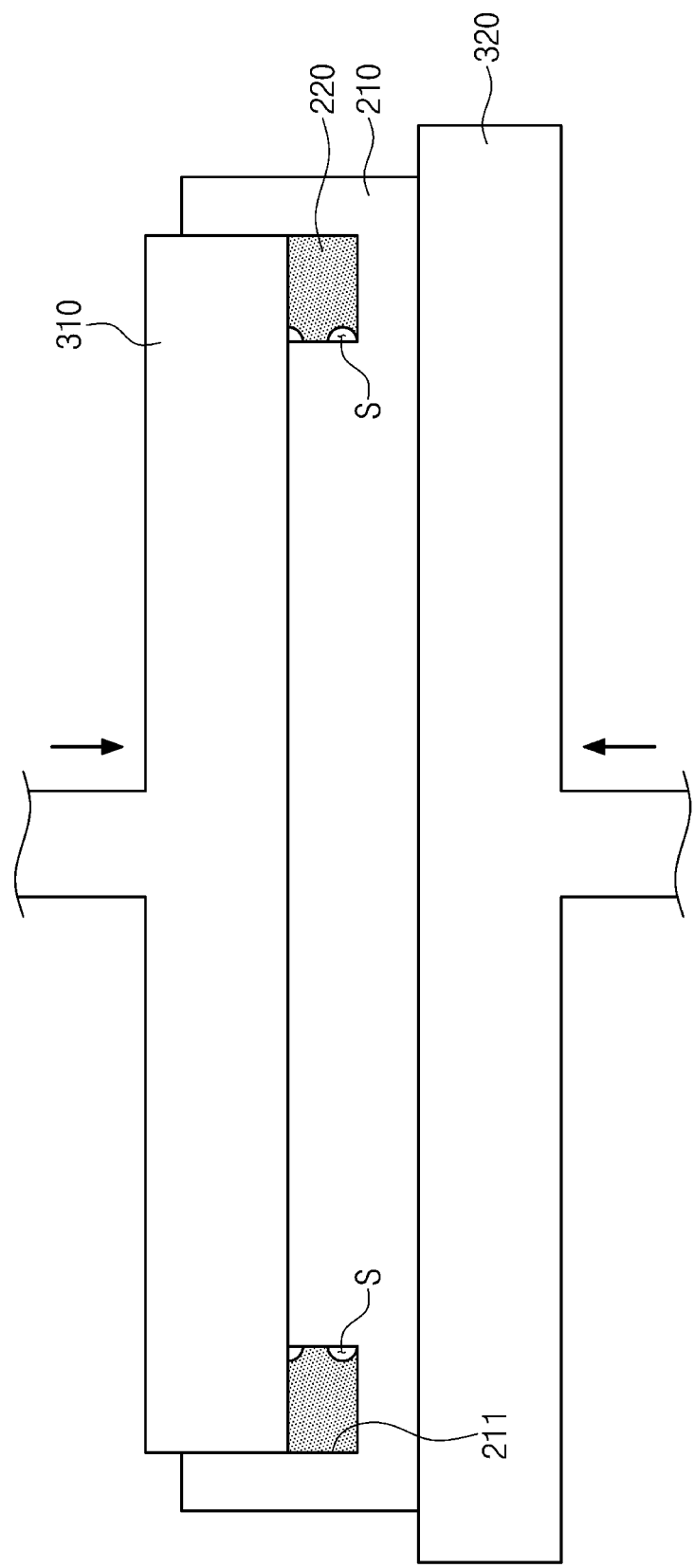

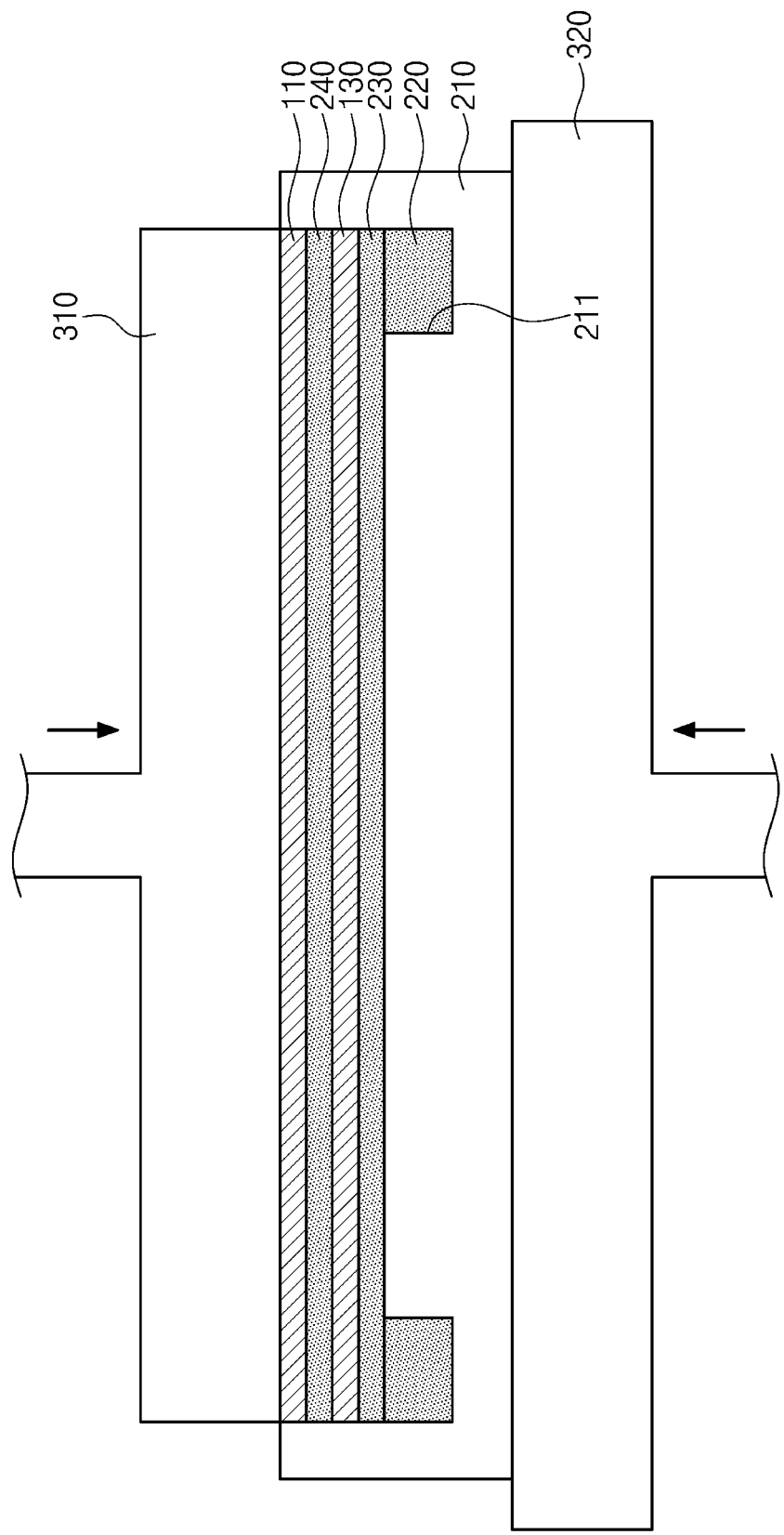

MOLD FOR MANUFACTURING SLAB AND MANUFACTURING METHOD THEREOF

CROSS-REFERENCE TO RELATED APPLICATIONS

This U.S. non-provisional patent application claims priority under 35 U.S.C. § 119 of Korean Patent Application No. 10-2018-0014742, filed on Feb. 6, 2018, the entire contents of which are hereby incorporated by reference.

BACKGROUND

The present disclosure herein relates to a mold for manufacturing a slab and a manufacturing method thereof. More particularly, the present disclosure relates to a mold for manufacturing a slab, which includes a base part and a frame part, which are integrated with each other without a boundary surface, and a manufacturing method thereof.

Typical wall materials for construction have been produced by cutting stone into a predetermined shape and polishing a surface thereof to be smooth. However, in recent years, imitation marbles are widely used due to various limitations such as limited resources, environment deterioration, and transportation issues. The imitation marble is an artificial composite that realizes texture of natural stone by mixing a base such as cement or a resin such as an acrylic resin, an unsaturated polyester resin, and/or an epoxy resin with additives such as crushed stone, minerals, and/or resin chips, and further adding additives such as pigment as necessary. Since the imitation marble has a beautiful appearance and an excellent processing property, and furthermore has a light weight and an excellent strength in comparison with a natural marble, the imitation marble is widely used for all sorts of interior materials such as a counter table and an outer wall of a building. The imitation marble is generally manufactured by filling the above-described materials into a predetermined frame.

SUMMARY

The present disclosure provides a mold for manufacturing a slab, which has excellent durability and excellent efficiency of manufacturing a slab.

An embodiment of the inventive concept provides a mold for manufacturing a slab, the mold including: a first fabric layer; a first rubber layer disposed on the first fabric layer; a second fabric layer disposed on the first rubber layer; and a second rubber layer disposed on the second fabric layer. Here, the second rubber layer includes a base part and a frame part extending from an edge of the base part, and the base part and the frame part are integrated with each other.

In an embodiment, each of the first rubber layer and the second rubber layer may include rubber and a curing agent, and the first rubber layer may have a weight composition ratio between the rubber and the curing agent, which is different from that between the rubber and the curing agent of the second rubber layer.

In an embodiment, a content of the curing agent of the second rubber layer may be less than that of the curing agent of the first rubber layer.

In an embodiment, the rubber may include ethylene-propylene rubber.

In an embodiment, the curing agent may include one of dicumyl peroxide or 2,4-dichlorophenol.

In an embodiment, the frame part may include quartz.

In an embodiment, each of the base part and the frame part may include a polymer, and the polymer of the base part and the polymer of the frame part may be cross-linked with each other.

In an embodiment of the inventive concept, a manufacturing method of a mold for manufacturing a slab includes: filling a first rubber composition into a recess of a metal mold; performing a first pressing and heating process of pressing and heating the first rubber composition by using a press; laminating a second rubber composition, a first fabric layer, a third rubber composition, and a second fabric layer in order on the first rubber composition; and performing a second pressing and heating process of pressing and heating the first rubber composition, the second rubber composition, the first fabric layer, the third rubber composition, and the second fabric layer by using the press.

In an embodiment, the performing of the second pressing and heating process may include curing the first to third rubber compositions.

In an embodiment, the performing of the second pressing and heating process may include cross-linking uncured rubber of the first rubber composition with uncured rubber of the second rubber composition.

In an embodiment, the performing of the first pressing and heating process may include removing a protruding portion formed on the metal mold before the first rubber composition is cured.

In an embodiment, the performing of the first pressing and heating process may include additionally filling the first rubber composition into a space formed in the first rubber composition before the first rubber composition is cured.

In an embodiment, the manufacturing method may further include contracting the first fabric layer and the second fabric layer in advance.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 5 is a view for explaining a second embodiment of the first heating and pressing process in the manufacturing method of the mold for manufacturing a slab according to an embodiment of the inventive concept; and FIG. 6 is a view for explaining a second heating and pressing process in the manufacturing method of the mold for manufacturing a slab according to an embodiment of the inventive concept.

DETAILED DESCRIPTION

Figure 1A:
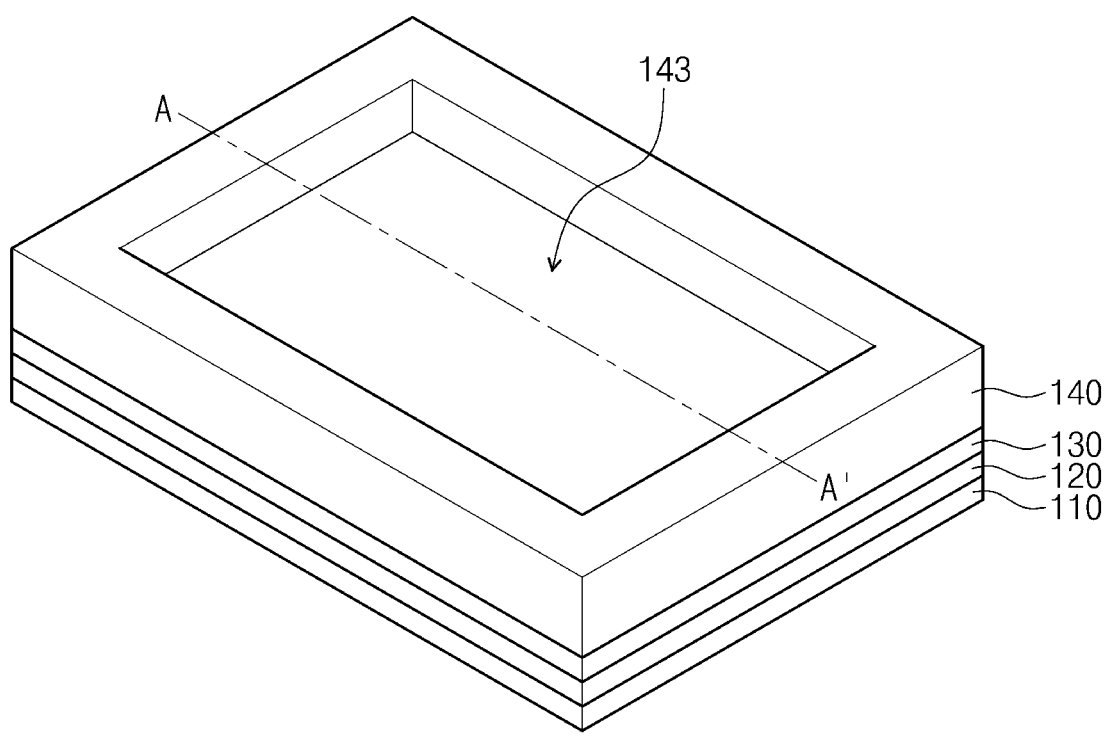
FIG. 1A is a perspective view illustrating a mold for manufacturing a slab according to an embodiment of the inventive concept.

Advantages and features of the present invention, and implementation methods thereof will be clarified through following embodiments described with reference to the accompanying drawings. The present invention may, however, be embodied in many different forms and should not be construed as being limited to the embodiments set forth herein. Rather, these embodiments are provided so that this disclosure will be thorough and complete, and will fully convey the concept of the invention to those skilled in the art. Further, the present invention is only defined by scopes of claims. Like reference numerals refer to like elements throughout.

In the following description, the technical terms are used only for explaining a specific exemplary embodiment while not limiting the inventive concept. In this specification, the terms of a singular form may include plural forms unless specifically mentioned. The meaning of "include," "comprise," "including," or "comprising," specifies a property, a region, a fixed number, a step, an element and/or a component but does not exclude other properties, regions, fixed numbers, steps, processes, elements and/or components.

Hereinafter, exemplary embodiments will be described in detail with reference to the accompanying drawings.

Figure 1B:
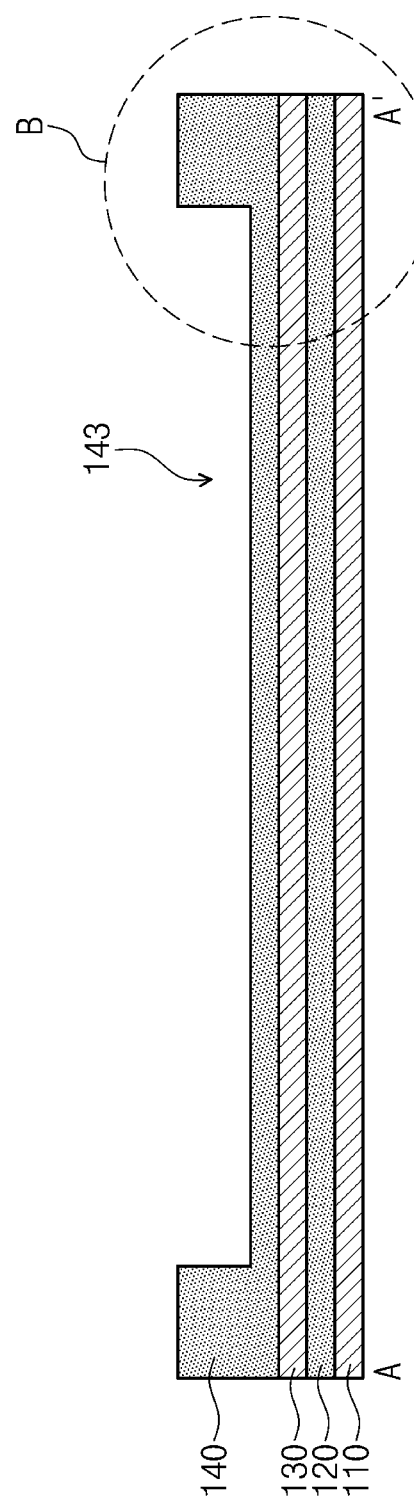
FIG. 1B is a cross-sectional view taken along line A-A' of FIG. 1A.
Figure 1C:
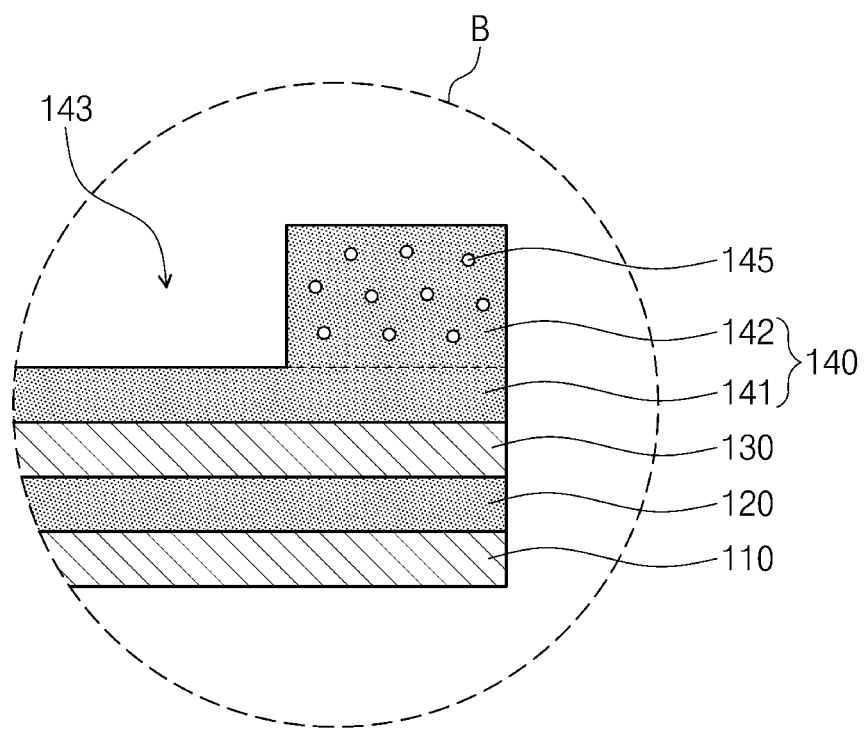
FIG. 1C is an enlarged view illustrating region B of FIG. 1B.

FIG. 1A is a perspective view illustrating a mold for manufacturing a slab according to an embodiment of the inventive concept, FIG. 1B is a cross-sectional view taken along line A-A' in FIG. 1A, and FIG. 1C is an enlarged view illustrating area B in FIG. 1B.

Referring to FIGS. 1A to 1C, the mold for manufacturing a slab (hereinafter, referred to as a slab manufacturing mold) according to an embodiment of the inventive concept includes a first fabric layer 110, a first rubber layer 120, a second fabric layer 130, and a second rubber layer 140.

The first fabric layer 110 may include a natural fabric or an artificial fabric. For example, the first fabric layer 110 may include nylon. The first fabric layer 110 may prevent the first rubber layer 120 from being deformed.

The first rubber layer 120 may be provided on the first fabric layer 110. The first rubber layer 120 may include rubber and a curing agent. For example, the rubber may be ethylene-propylene rubber. For example, the rubber may include a polymer containing carbon (C) and hydrogen (H).

For example, the curing agent may be one of dicumyl peroxide or 2,4-dichlorophenol. For example, the curing agent may include oxygen (O) and hydrogen (H). The first rubber layer 120 may have a specific composition ratio between the rubber and the curing agent. For example, the first rubber layer 120 may have a weight composition ratio between the rubber and the curing agent of about 98.5:1.5.

The second fabric layer 130 may be provided on the first rubber layer 120. The second fabric layer 130 may include a natural fabric or an artificial fabric. For example, the second fabric layer 130 may include nylon. The second fabric layer 130 may prevent the first rubber layer 120 and the second rubber layer 140 from being deformed.

The second rubber layer 140 may be provided on the second fabric layer 130. The second rubber layer 140 may include a base part 141 and a frame part 142. The frame part 142 may extend upward from an edge of the base part 141.

The base part 141 and the frame part 142 may provide a molding space 143 in which a raw material of a slab is accommodated. The second rubber layer 140 may include rubber and a curing agent. In other words, the second rubber layer 140 may include the same material as the first rubber layer 120. For example, the rubber may be ethylene-propylene rubber. For example, the rubber may include a polymer containing carbon (C) and hydrogen (H).

For example, the curing agent may be one of dicumyl peroxide or 2,4-dichlorophenol. The second rubber layer 140 may have a weight composition ratio between the rubber and the curing agent, which is different from that between the rubber and the curing agent of the first rubber layer 120. For example, the curing agent may include oxygen (O) and hydrogen (H). For example, the second rubber layer 140 may have a weight composition ratio between the rubber and the curing agent of about 98.8:1.2. A content of the curing agent in the second rubber layer 140 may be less than that of the curing agent in the first rubber layer 120.

The base part 141 and the frame part 142 may be integrated with each other. In other words, the base part 141 and the frame part 142 may be integrated with each other without an attachment boundary therebetween. For example, a polymer of the rubber of the base part 141 and a polymer of the rubber of the frame part 142 may be cross-linked with each other. In this case, the curing agent may act as a cross-linking agent. In other words, the oxygen (O) and the hydrogen (H) of the curing agent may cross-link the polymer of the rubber of the base part 141 with the polymer of the rubber of the frame part 142.

The frame part 142 may further comprise quartz 145. The quartz 145 may a mineral containing silicon (Si) and oxygen (O). As the quartz 145 is contained, the frame part 142 may be improved in wear resistance and strength.

Figure 2:
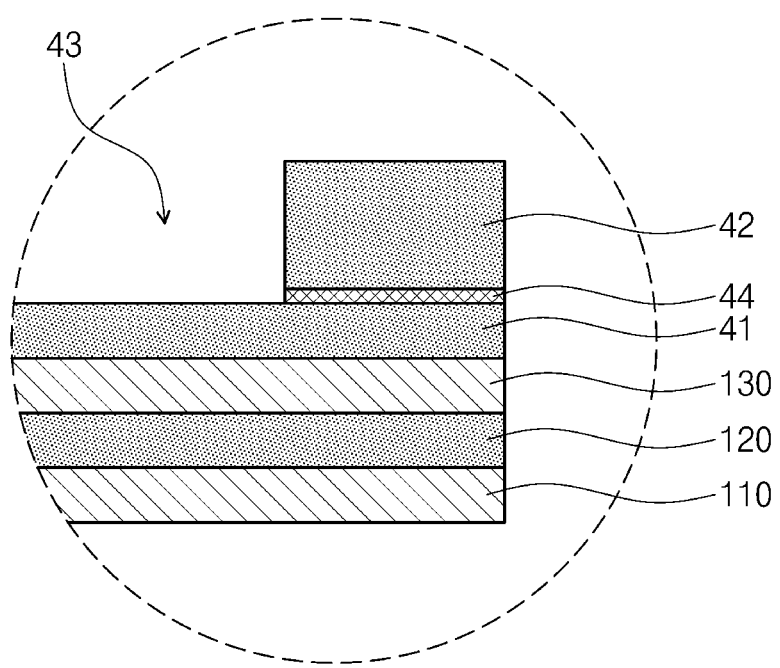
FIG. 2 is a cross-sectional view for explaining a mold for manufacturing a slab according to a comparative example of an embodiment of the inventive concept.

FIG. 2 is a cross-sectional view for explaining a slab manufacturing mold according to a comparative example of an embodiment of the inventive concept.

Referring to FIG. 2, the slab manufacturing mold may include an adhesion layer 44 between a base part 41 and a frame part 42. The base part 41 and the frame part 42 may be attached to each other by the adhesion layer 44. The adhesion layer 44 may have a corrosion resistance and a wear resistance, which are less than those of each of the base part 41 and the frame part 42. Accordingly, the adhesion layer 44 may be intensively corroded and worn by the raw material of the slab provided in a molding space 43, and thus the base part 41 and the frame part 42 may be separated from each other. Accordingly, the slab manufacturing mold including the adhesion layer 44 may be insufficient in durability. Also, since the adhesion layer 44 has an ununiform thickness, the frame part 42 has an ununiform height.

Referring to FIGS. 1A to 1C again, the slab manufacturing mold according to an embodiment of the inventive concept may include the base part 141 and the frame part 142, which are integrated with each other without an adhesion layer. Accordingly, a portion, which is intensively corroded and worn by the raw material of the slab provided in the molding space 143, may not be provided. For example, in the slab manufacturing mold according to an embodiment of the inventive concept, the polymer of the rubber of the base part 141 and the polymer of the rubber of the frame part 142 may be cross-linked with each other. Accordingly, a coupling force between the base part 141 and the frame part 142 may be relatively strong. Resultantly, the slab manufacturing mold according to an embodiment of the inventive concept may be excellent in durability. Also, since the adhesion layer is not provided, the frame part 142 may have a uniform height. As the frame part 142 has the uniform height, an efficiency of manufacturing a slab may be excellent.

Figure 3:
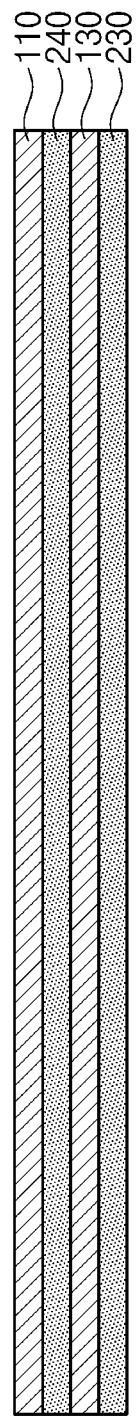
FIG. 3 is a view for explaining a lamination process in a manufacturing method of a mold for manufacturing a slab according to an embodiment of the inventive concept.

FIG. 3 is a view for explaining a lamination process in a manufacturing method of a slab manufacturing mold according to an embodiment of the inventive concept.

Referring to FIG. 3, a first rubber composition 230, a second fabric layer 130, a second rubber composition 240, and a first fabric layer 110 may be sequentially laminated.

The first rubber composition 230 may include uncured rubber and a curing agent. For example, the uncured rubber may be ethylene-propylene rubber. For example, the uncured rubber may include a polymer containing carbon (C) and hydrogen (H). The uncured rubber may represent rubber having a relatively low strength because polymers contained therein are not cross-linked. For example, the uncured rubber may have a strength similar to that of liquid having extremely high viscosity. For example, the curing agent may be one of dicumyl peroxide or 2,4-dichlorophenol. For example, the curing agent may include oxygen (O) and hydrogen (H). For example, the first rubber layer 230 may have a weight composition ratio between the uncured rubber and the curing agent of about 98.8:1.2.

The second fabric layer 130 may be contracted in advance before being laminated on the first rubber composition 230. This may decrease a contraction amount in a heating and pressing process. For example, the second fabric layer 130 may be contracted in advance by heat treatment.

The second rubber composition 240 may include uncured rubber and a curing agent. For example, the uncured rubber may be uncured ethylene-propylene rubber. For example, the uncured rubber may include a polymer containing carbon (C) and hydrogen (H). For example, the curing agent may be one of dicumyl peroxide or 2,4-dichlorophenol. For example, the curing agent may include oxygen (O) and hydrogen (H). The second rubber layer 240 may have a weight composition ratio between the uncured rubber and the curing agent, which is different from that of the first rubber layer 230. For example, the second rubber layer 240 may have a weight composition ratio between the uncured rubber and the curing agent of about 98.5:1.5. A content of the curing agent in the second rubber composition 240 may be greater than that of the curing agent in the first rubber composition 230.

The first fabric layer 110 may be contracted in advance before being laminated on the second rubber composition 240. This may decrease a contraction amount in a heating and pressing process. For example, the first fabric layer 110 may be contracted in advance by heat treatment.

Figure 4A:
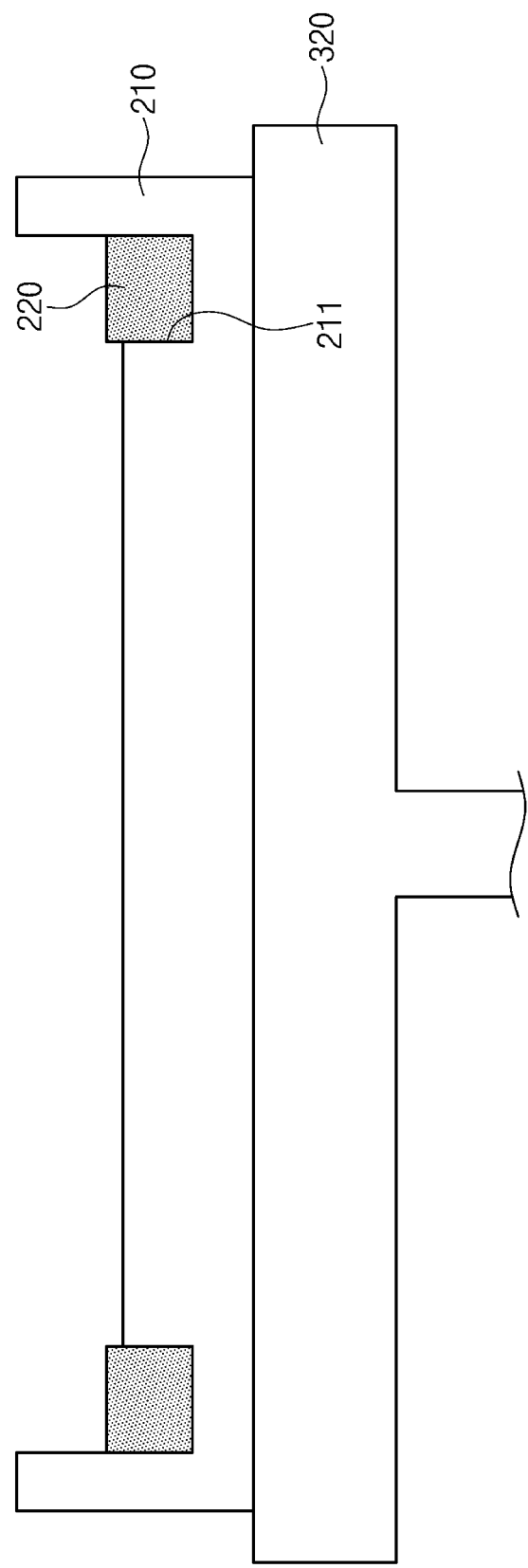
FIGS. 4A to 4C are views for explaining a first embodiment of a first heating and pressing process in a manufacturing method of a mold for manufacturing a slab according to an embodiment of the inventive concept.
Figure 4B:
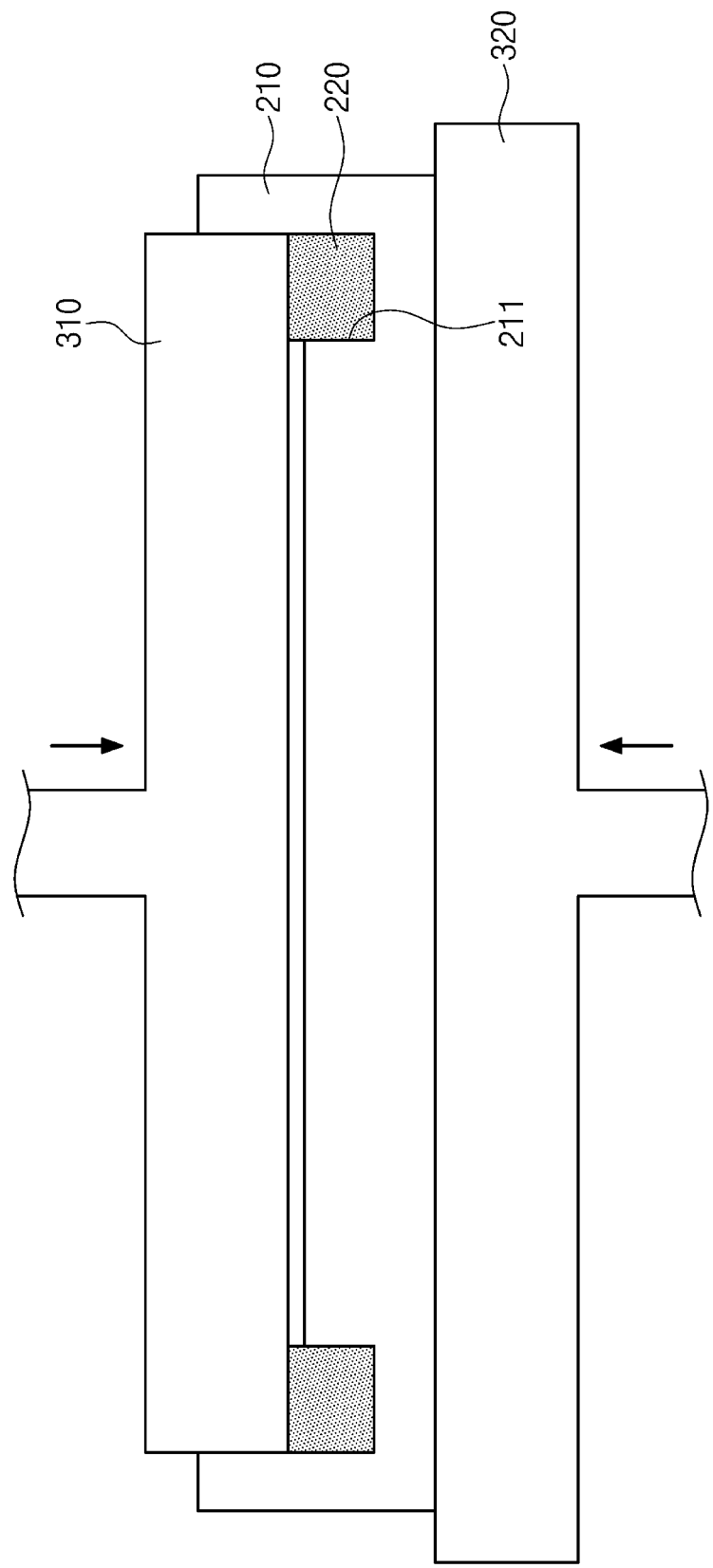
Figure 4C:
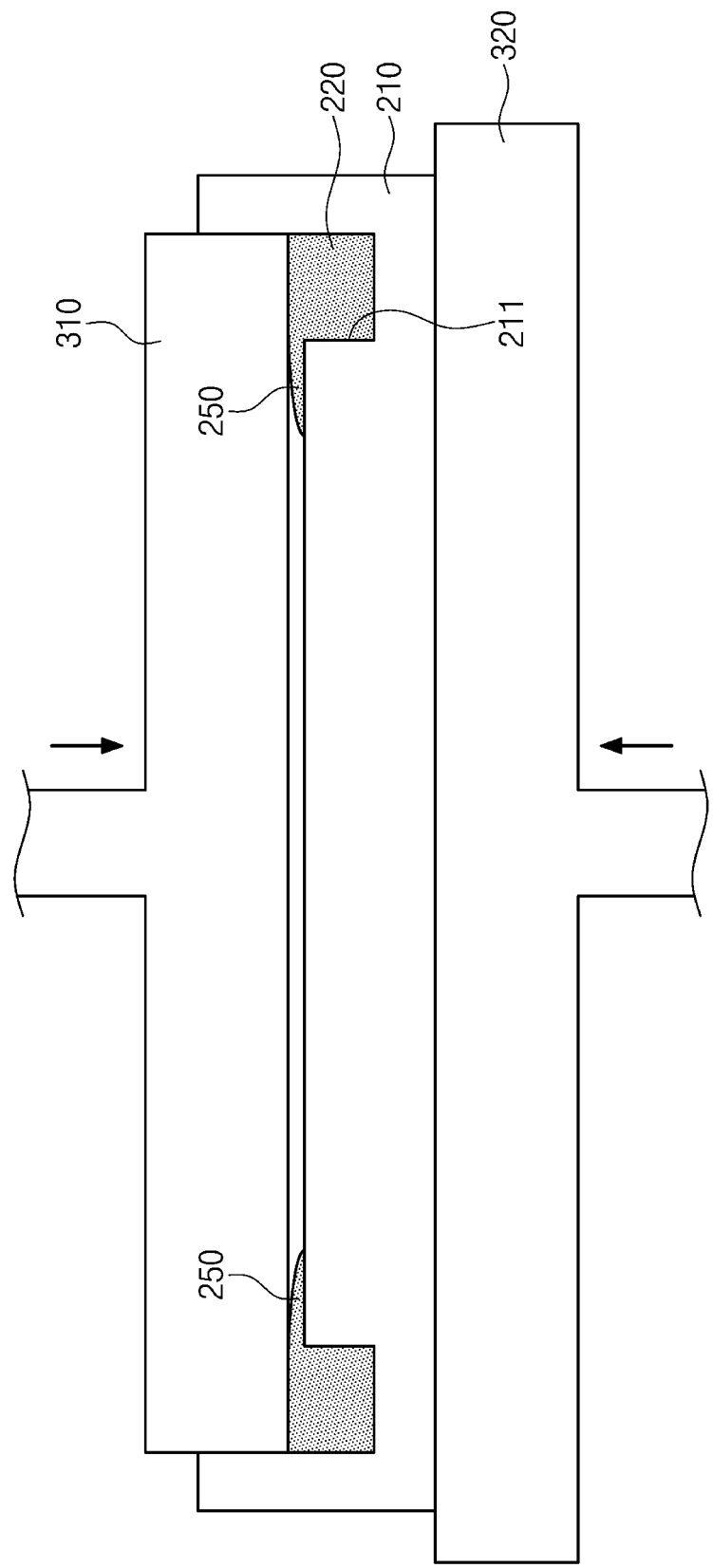

FIGS. 4A to 4C are views for explaining a first embodiment of a first heating and pressing process in the manufacturing method of the slab manufacturing mold according to an embodiment of the inventive concept.

Referring to FIG. 4A, a third rubber composition 220 may be filled in a recess 211 of a metal mold 210. The third rubber composition 220 may include uncured rubber and a curing agent. For example, the uncured rubber may be uncured ethylene-propylene rubber. For example, the uncured rubber may include a polymer containing carbon (C) and hydrogen (H). For example, the curing agent may be one of dicumyl peroxide or 2,4-dichlorophenol. For example, the curing agent may include oxygen (O) and hydrogen (H). The third rubber composition 220 may further include quartz 145 (refer to FIG. 1C). The third rubber composition 220 and the first rubber composition 230 may have the same weight composition ratio between the uncured rubber and the curing agent as each other. For example, the third rubber layer 220 may have a weight composition ratio between the uncured rubber and the curing agent of about 98.8:1.2.

Referring to FIG. 4B, firstly, the third rubber composition 220 may be heated and pressed. An upper press 310 and a lower press 320 may vertically press the metal mold 210 and the third rubber composition 220 from the top and bottom thereof. While being pressed, the upper press 310 and the lower press 320 may heat the metal mold 210 and the third rubber composition 220 at the same time. The upper press 310 and the lower press 320 may increase in temperature by high temperature air heating, heating due to induction, resistance heating, infrared rays radiation heating, and heating due to a gas burner, and the metal mold 210 and the third rubber composition 220 may be heated.

The third rubber composition 220 may decrease in strength by the heating and pressing of the upper press 310 and the lower press 320. As polymers contained in the uncured rubber of the third rubber composition 220 may increase in kinetic energy by the heating, the strength of the third rubber composition 220 may decrease in strength. The heating and pressing may be continued before curing of the third rubber composition 220 is initiated, i.e., scorching time.

The third rubber composition 220 may have a shape corresponding to that of the recess 211 of the metal mold 210 by the heating and pressing of the upper press 310 and the lower press 320.

Referring to FIG. 4C, a protruding portion 250 may be formed on the metal mold 210 by the heating and pressing of the upper press 310 and the lower press 320. The protruding portion 250 may be formed when an excessive amount of the third rubber composition 220 is filled in the recess 211 of the metal mold 210. The protruding portion 250 may be unnecessary portion in the manufacturing process of the slab manufacturing mold. The protruding portion 250 may be removed before the curing of the third rubber composition 220 is initiated. In other words, the protruding portion 250 may be removed before the scorching time. Since the third rubber composition 220 before the scorching time has the low strength as the kinetic energy increases, the protruding portion 250 may be easily removed. In order to remove the protruding portion 250, the heating and pressing of the upper press 310 and the lower press 320 may be temporarily stopped, and the third rubber composition 220 may be detached from the metal mold 210. Thereafter, the protruding portion 250 may be removed by visually checking whether the protruding portion 250 is formed. For example, the protruding portion 250 may be removed through cutting. As the manufacturing method of the slab manufacturing mold according to an embodiment of the inventive concept includes the removing of the protruding portion 250, the uniform slab manufacturing mold may be manufactured, and the manufacturing process may be simplified.

FIG. 5 is a view for explaining a second embodiment of the first heating and pressing process in the manufacturing method of the slab manufacturing mold according to an embodiment of the inventive concept.

Referring to FIG. 5, when the third rubber composition 220 is heated and pressed by the upper press 310 and the lower press 320 as in FIG. 4B, a space S may be formed in the third rubber composition 220. The space S may be formed when an insufficient amount of the third rubber composition 220 is filled in the recess 211 of the metal mold 210. As the space S is formed, the slab manufacturing mold may not have a desired shape. In order to form the desired shape of the slab manufacturing mold, the third rubber composition 220 may be additionally filled into the space S. The third rubber composition 220 may be additionally filled into the space S before curing of the existing third rubber composition 220 is initiated. In other words, the space S may be filled before the scorching time. Since the third rubber composition 220 before the scorching time has the low strength as the kinetic energy increases, the space S may be easily filled. In order to fill the space S, the heating and pressing of the upper press 310 and the lower press 320 may be temporarily stopped, and the third rubber composition 220 may be detached from the metal mold 210. Thereafter, the third rubber composition 220 may be filled into the space S by visually checking whether the space S is formed. As the manufacturing method of the slab manufacturing mold according to an embodiment of the inventive concept includes the filling of the space S, the uniform slab manufacturing mold may be manufactured, and the manufacturing process may be simplified.

FIG. 6 is a view for explaining a second heating and pressing process in the manufacturing method of the slab manufacturing mold according to an embodiment of the inventive concept.

Referring to FIG. 6, the first rubber composition 230, the second fabric layer 130, the second rubber composition 240, and the first fabric layer 110 may be laminated on the third rubber composition 220, on which the first heating and pressing process is performed. Thereafter, the first to third rubber compositions 230, 240, and 220, the first fabric layer 110, and the second fabric layer 130 may be heated and pressed by the upper press 310 and the lower press 320.

The first to third rubber compositions 230, 240, and 220 may be cured by the heating and pressing. In other words, uncured rubber of the first to third rubber compositions 230, 240, and 220 may be cured. The curing may be initiated after the scorching time of the first to third rubber compositions 230, 240, and 220. In other words, the first to third rubber compositions 230, 240, and 220 may be heated and pressed by the upper press 310 and the lower press 320 even after the scorching time of the first to third rubber compositions 230, 240, and 220. The uncured rubber may have a thermosetting property.

During the curing, the polymers contained in the uncured rubber of the first to third rubber compositions 230, 240, and 220 may be cross-linked with each other. At the same time, the polymer contained in the uncured rubber of the first rubber composition 230 and the polymer contained in the uncured rubber of the third rubber composition 220 may be cross-linked with each other. As a result of the cross-link, the first to third rubber compositions 230, 240, and 220 may increase in strength, thermal resistance, and corrosion resistance. Also, a coupling force between the first rubber composition 230 and the third rubber composition 220 may increase. As a result of the cross-link, the first rubber composition 230 and the third rubber composition 220 may be integrated with each other. In other words, the first rubber composition 230 and the third rubber composition 220 may be integrated with each other without a boundary therebetween.

The curing agent contained in the first to third rubber compositions 230, 240, and 220 may serve as a cross-linking agent. In other words, the oxygen (O) and the hydrogen (H) contained in the curing agent may cross-link the polymers contained in the uncured rubber of the first to third rubber compositions 230, 240, and 220.

Curing speeds of the first to third rubber compositions 230, 240, and 220 may be varied according to a content of the curing agent and an amount of heat transmitted from the upper press 310 and the lower press 320. Since the first and third rubber compositions 230 and 220 directly contact the lower press 320, and the first fabric layer 110 is provided between the second rubber composition 240 and the upper press 310, an amount of heat transmitted to the first and third rubber compositions 230 and 220 may be greater than that of the heat transmitted to the second rubber composition 240. When a content of the curing agent in the second rubber composition 240 is greater than that of the curing agent in each of the first and third rubber compositions 230 and 220, although a small amount of heat is transmitted to the second rubber composition 240, the curing speeds of the first to third rubber compositions 230, 240, and 220 may be similar to each other.

The manufacturing method of the slab manufacturing mold according to an embodiment of the inventive concept may be simplified in manufacturing process by simultaneously heating and pressing the first to third rubber compositions 230, 240, and 220, the first fabric layer 110, and the second fabric layer 130.

Referring to FIGS. 1A to 1C again, when the curing of the first to third rubber compositions 230, 240, and 220 is completed by the second heating and pressing process, the manufacturing of the slab manufacturing mold including the first fabric layer 110, the first rubber layer 120, the second fabric layer 130, and the second rubber layer 140 according to an embodiment of the inventive concept is completed.

The mold for manufacturing a slab according to an embodiment of the inventive concept includes the base part and the frame part, which are integrated with each other without the attachment process, to have excellent durability and excellent efficiency of manufacturing the slab.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A mold for manufacturing a slab, the mold comprising:
a first fabric layer;
a first rubber layer disposed on the first fabric layer;
a second fabric layer disposed on the first rubber layer; and
a second rubber layer disposed on the second fabric layer,
wherein the second rubber layer comprises a base part and a frame part extending from an edge of the base part,
wherein the base part comprises a first region and a second region surrounded by the first region,
wherein the first region of the base part is located at the edge of the base part and overlaps vertically with the frame part,
wherein the second region of the base part is exposed by the frame part,
wherein a first level of a top surface of the second region of the base part and a second level of a lowermost portion of the frame part are substantially the same, and
wherein an uppermost portion of the frame part and the lowermost portion of the frame part include same polymer.

2. The mold of claim 1, wherein each of the first rubber layer and the second rubber layer comprises rubber and a curing agent, and the first rubber layer has a weight composition ratio between the rubber and the curing agent, which is different from that between the rubber and the curing agent of the second rubber layer.

3. The mold of claim 2, wherein a content of the curing agent of the second rubber layer is less than that of the curing agent of the first rubber layer.

4. The mold of claim 2, wherein the rubber comprises ethylene-propylene rubber.

5. The mold of claim 2, wherein the curing agent comprises one of dicumyl peroxide or 2,4-dichlorophenol.

6. The mold of claim 1, wherein the frame part comprises quartz.

7. A mold for manufacturing a slab, the mold comprising:
a first fabric layer;
a first rubber layer disposed on the first fabric layer;
a second fabric layer disposed on the first rubber layer; and
a second rubber layer disposed on the second fabric layer,
wherein the second rubber layer comprises a base part and a frame part extending from an edge of the base part,
wherein the base part and the frame part are integrated with each other,
wherein each of the base part and the frame part comprises a polymer,
wherein the polymer of the base part and the polymer of the frame part are cross-linked with each other, and
wherein no adhesion layer is present between the base part and the frame part in a direction perpendicular to a top surface of the base part.

8. A mold for manufacturing a slab, the mold comprising:
a first fabric layer;
a first rubber layer disposed on the first fabric layer;
a second fabric layer disposed on the first rubber layer; and
a second rubber layer disposed on the second fabric layer,
wherein the second rubber layer comprises a base part and a frame part extending from an edge of the base part,
wherein the base part and the frame part are integrated with each other,
wherein each of the base part and the frame part comprises a polymer,
wherein the polymer of the base part and the polymer of the frame part are cross-linked with each other, and
wherein no adhesion layer is present between a mating surface of the base part and the frame part.

\* \* \* \* \*